(12) United States Patent
Nolan

(10) Patent No.: US 6,618,131 B1
(45) Date of Patent: Sep. 9, 2003

(54) SYSTEM AND METHOD FOR MEASURING THE QUALITY OF AN ILLUMINATION FIELD FROM A LASER LINE ILLUMINATION SYSTEM

(75) Inventor: John F. Nolan, Haverhill, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/854,612

(22) Filed: May 14, 2001

(51) Int. Cl.⁷ .................................................. G01J 1/00
(52) U.S. Cl. ........................................ 356/121; 356/122
(58) Field of Search ......................... 356/121, 122–123; 359/738–740

(56) References Cited

U.S. PATENT DOCUMENTS

| | | | |
|---|---|---|---|
| 4,828,384 A | * 5/1989 | Plankenhorn et al. | 356/121 |
| 5,459,565 A | 10/1995 | Aharon | 356/121 |
| 5,914,777 A | * 6/1999 | Imura | 356/121 |

FOREIGN PATENT DOCUMENTS

| | | |
|---|---|---|
| EP | 0319345 | 6/1989 |
| FR | 811143 | 4/1937 |
| FR | 2663738 | 12/1991 |

* cited by examiner

Primary Examiner—Jordan M. Schwartz
(74) Attorney, Agent, or Firm—William E. Hilton

(57) ABSTRACT

A system is disclosed for analyzing an illumination field of a line of laser illumination. The system includes a first movable unit, a second movable unit, and a sensor unit. The first movable unit includes a first opening through which at least a portion of the illumination field may pass. The first movable unit is adapted for movement in a first direction. The sensor unit is adapted to receive illumination and to produce a sensor output signal representative a characteristic of the illumination field. The second movable unit includes a second opening through which at least a portion of the illumination field may pass. The second movable unit is positioned between the first movable unit and the sensor unit and is adapted for movement between at least a first position in which very little or no light from the illumination field may reach the sensor unit, and a second position in which a relatively high amount of light from the illumination field may reach the sensor unit.

16 Claims, 8 Drawing Sheets

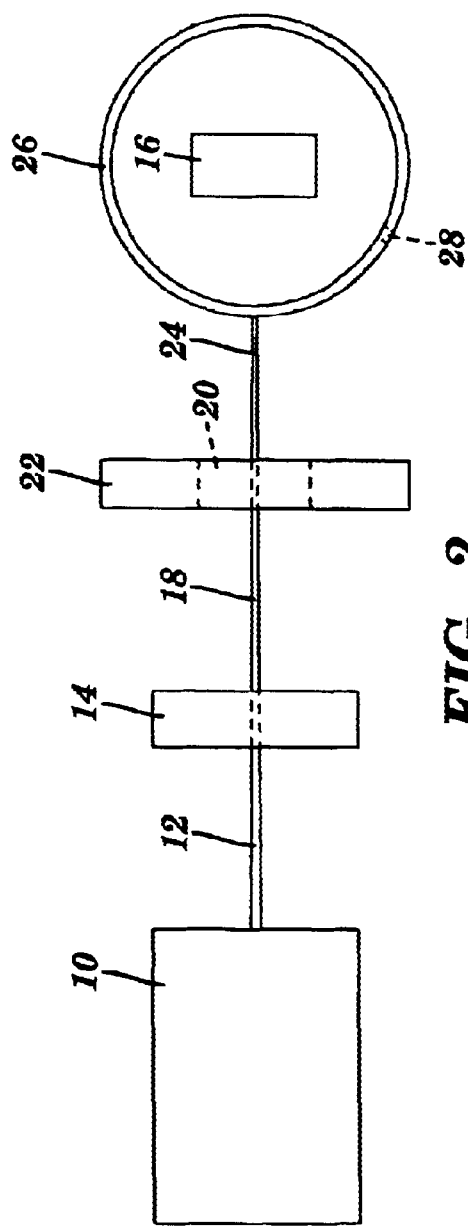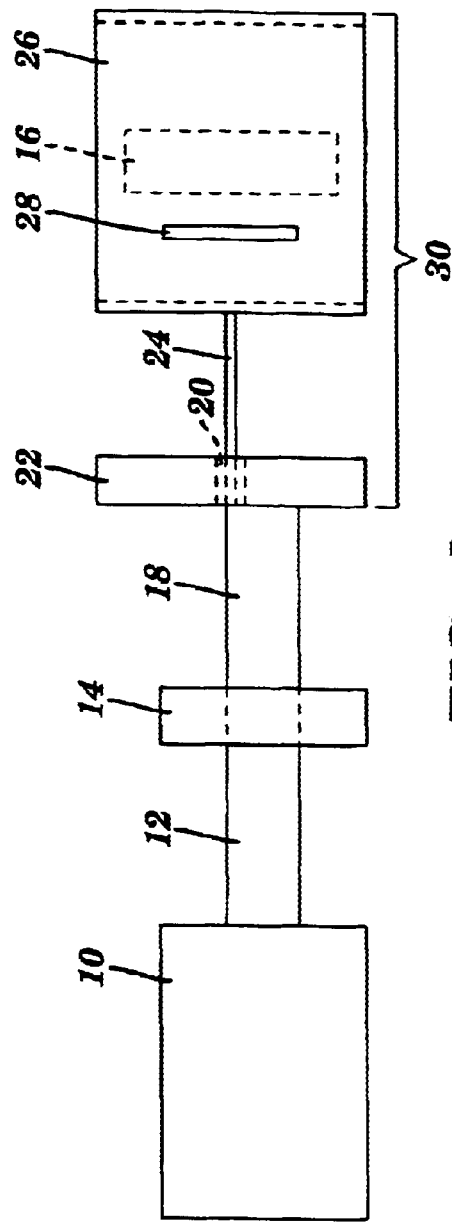

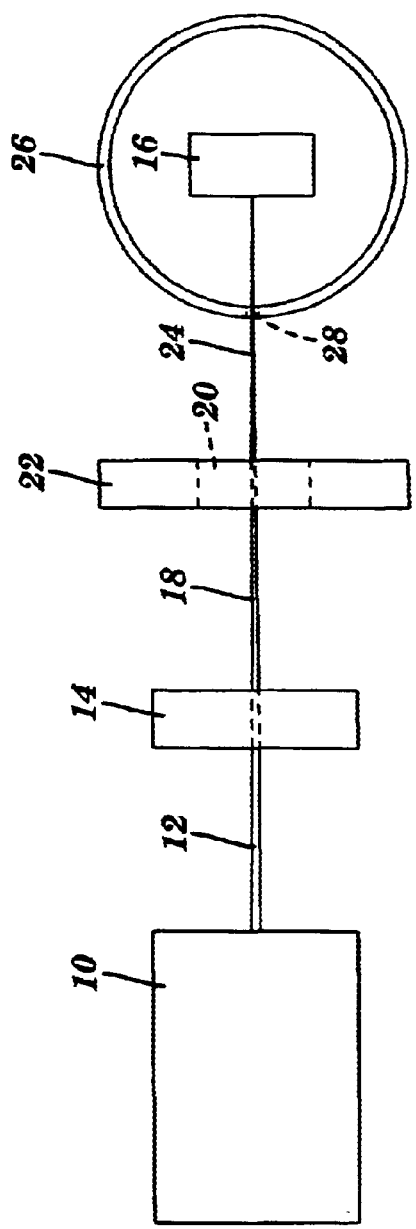
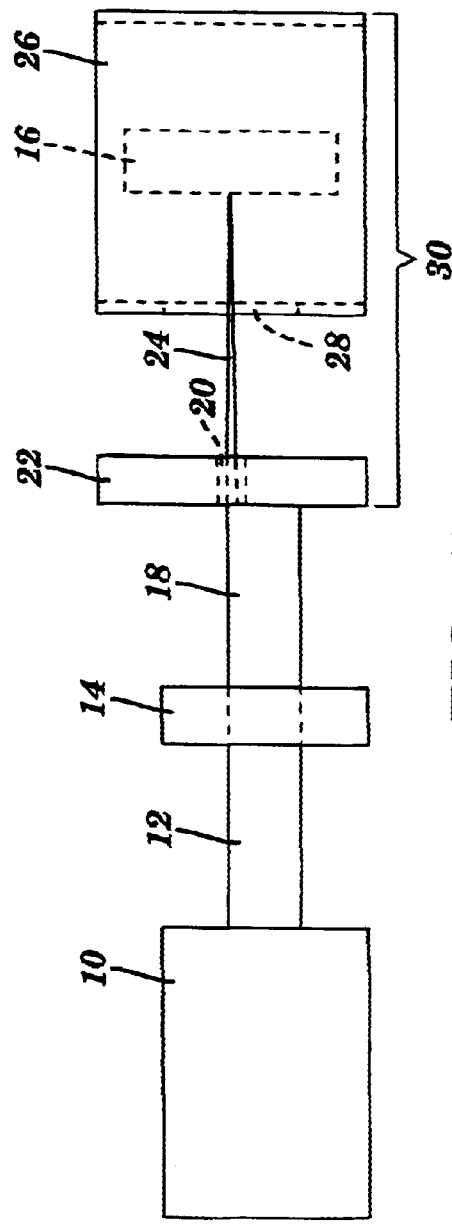
FIG. 4
FIG. 5

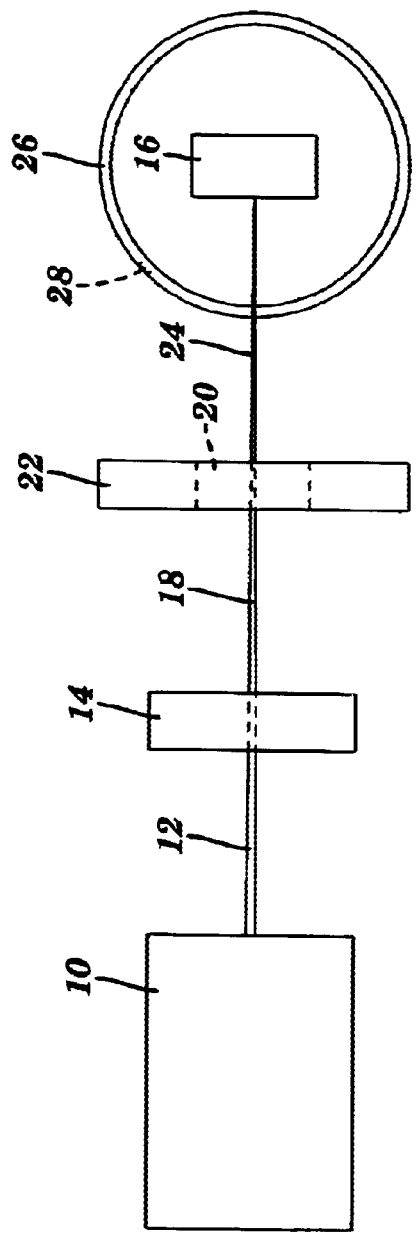
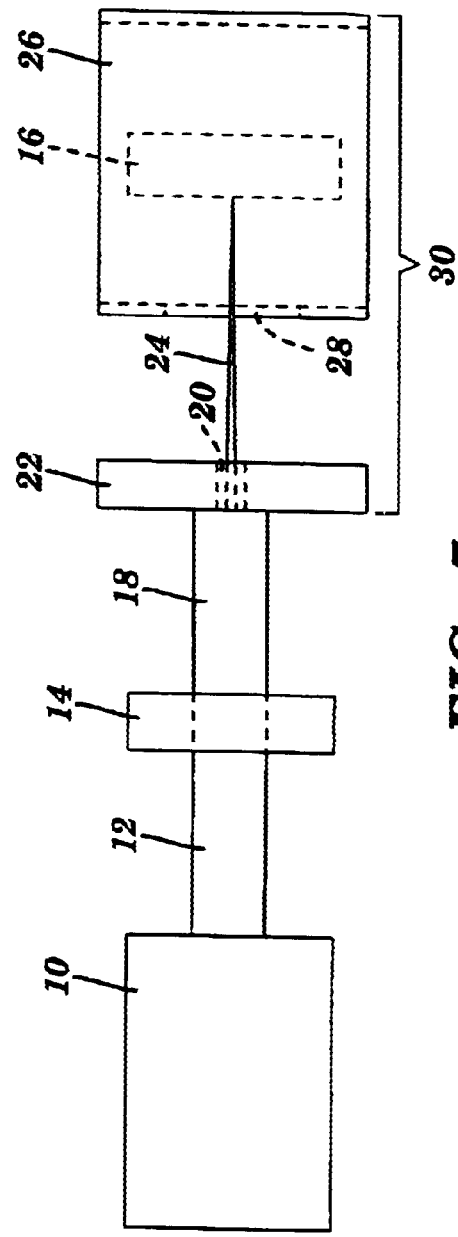

SYSTEM AND METHOD FOR MEASURING THE QUALITY OF AN ILLUMINATION FIELD FROM A LASER LINE ILLUMINATION SYSTEM

BACKGROUND OF THE INVENTION

The invention generally relates to the field of laser line illuminators, and specifically relates to systems and methods for measuring the quality of an illumination field from a laser line illumination system.

Laser line illumination systems generally employ an array of light sources, such as light emitting diodes, coupled with optics that produce a laser illumination field in the shape of a line. The optics may include a variety of optical elements including, for example, lenses, micro-lenses, and mirrors, as well as fiber optic cables.

Such systems may be used for a numerous applications, such as in imaging systems in which the laser line illumination field is directed toward a light modulator that modulates the illumination field by either selectively reflecting or transmitting specificed portions of the illumination field. The modulated illumination field is then directed toward an imaging surface in which a portion of imageable media is selectively imaged. Either the illumination field or the imageable surface (such as a drum) is then moved with respect to other so that further portions of the imageable media may then be successively imaged.

Non-uniformities in the illumination field of a laser line illumination system may result in significant imaging inconsistencies that may be difficult to detect or correct. It is desirable that such laser line illumination systems produce an illumination field that has a uniform width throughout the length of the illumination line. It is also desirable that such systems produce an illumination field that has a uniform peak power throughout the illumination line. It is further desirable that such systems produce an illumination field that has a uniform power distribution throughout the length of the illumination line. It is further desirable that such systems produce an illumination field that has a uniform spot size throughout the length of the illumination line.

There is a need therefore, for a system and method of measuring the output characteristics of a laser line illumination system.

SUMMARY OF THE INVENTION

The invention provides a system for analyzing an illumination field of a line of laser illumination. The system includes a first movable unit, a second movable unit, and a sensor unit. The first movable unit includes a first opening through which at least a portion of the illumination field may pass. The first movable unit is adapted for movement in a first direction. The sensor unit is adapted to receive illumination and to produce a sensor output signal representative a characteristic of the illumination field. The second movable unit includes a second opening through which at least a portion of the illumination field may pass. The second movable unit is positioned between the first movable unit and the sensor unit and is adapted for movement between at least a first position in which very little or no light from the illumination field may reach the sensor unit, and a second position in which a relatively high amount of light from the illumination field may reach the sensor unit.

BRIEF DESCRIPTION OF THE DRAWINGS

The following description may be further understood with reference to the accompanying drawings in which:

FIG. 2 shows an illustrative top view of the system of FIG. 1;

FIG. 3 shows an illustrative side view of the system of FIG. 1;

FIG. 4 shows an illustrative top view of the system of FIG. 1 with the slit unit rotated such that the slit is aligned with the illumination field;

FIG. 5 shows an illustrative side view of the system shown in FIG. 4;

FIG. 6 shows an illustrative top view of the system of FIG. 1 with the slit unit further rotated;

FIG. 7 shows an illustrative side view of the system of FIG. 1 with the aperture unit and slit unit moved downward;

The drawings are shown for illustrative purposes only, and are not to scale.

DETAILED DESCRIPTION OF THE INVENTION

Figure 1:
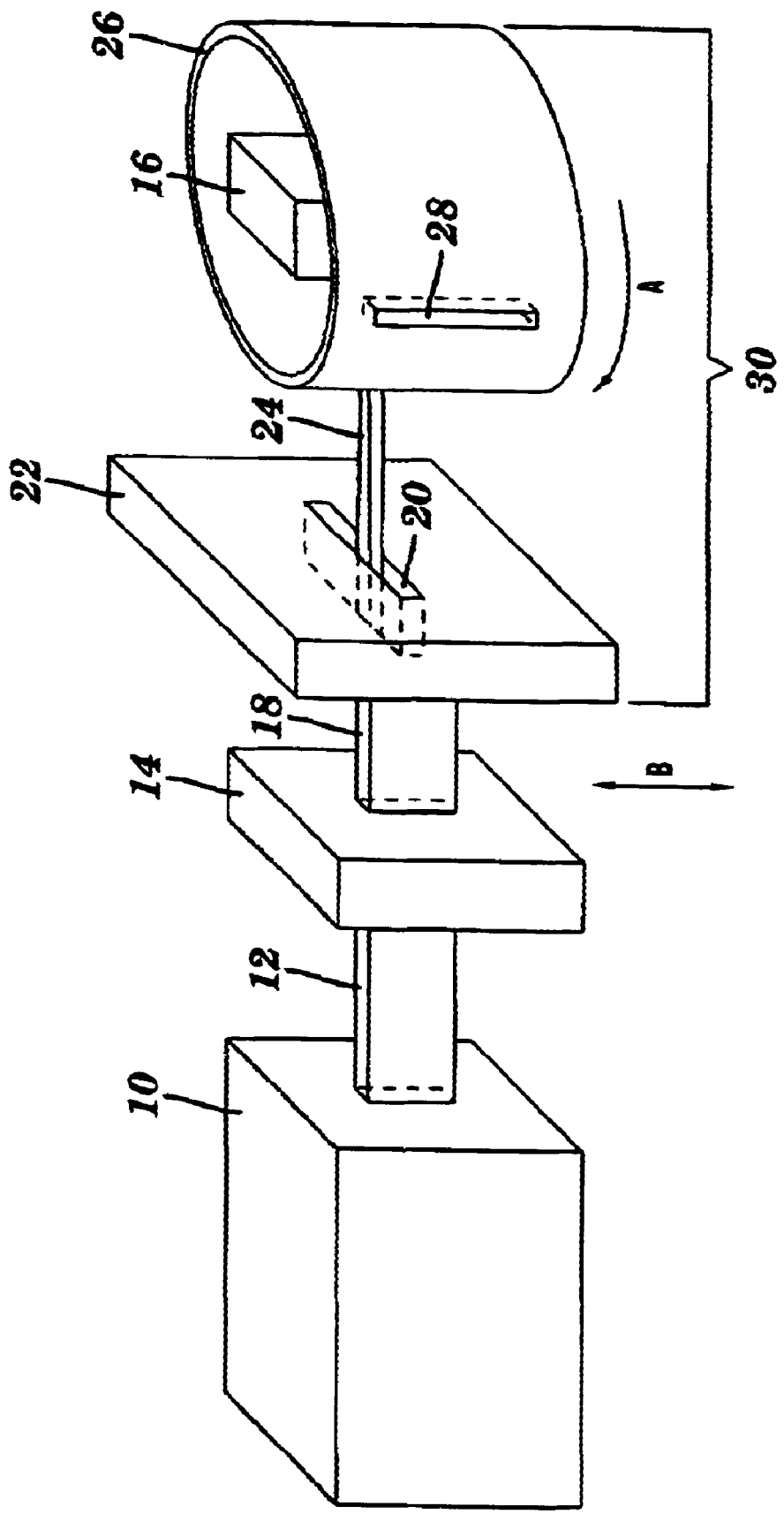
FIG. 1 shows an illustrative view of an illumination field measurement system in accordance with an embodiment of the invention.

As shown in FIGS. 1–3, a system in accordance with an embodiment of the invention may be used with laser system 10 that produces a line of laser illumination 12. In various embodiments, the laser system 10 may include a variety of optical devices such as micro-lenses and fiber optic cables. The line of laser illumination 12 is then transmitted through a filter 14 such as a mirror, e.g., a 99% reflecting mirror, to reduce the amount of light that is received by the sensor unit 16. The filtered line of laser illumination 18 is then passed through an aperture 20 in an aperture unit 22. A portion 24 of the illumination is then received by a rotating slit unit 26 that includes a slit opening 28 is its outer wall.

The rotating slit unit 26 is adapted to rotate as indicated at "A", and the combined assembly 30 of the aperture unit 22 and the rotating slit unit 26 is adapted to travel up and down with respect to the laser illumination system as indicated at "B". The laser line of illumination may, for example, be 75 microns by 18 mm. The aperture 20 may have a width of 150 um (microns) and a length of 3 mm.

The slit 28 may have a width of 1 micron and a length of 3 mm. In an embodiment, the aperture 20 is oriented orthogonal to the orientation of the illumination line arid is positioned to be at or near the focal plane of the illumination line. The slit 28 is positioned to be orthogonal to the aperture 20 and parallel with the orientation of the illumination line.

During use, the combined assembly 30 is moved so that the aperture 20 of the aperture unit 22 is positioned at the top of the filtered illumination field 18. The rotating slit unit 26 is then rotated so that the slit 28 passes in front of the portion 24 of the illumination field that is transmitted from the aperture unit 22 as shown in FIGS. 4 and 5. The rotating slit unit then continues rotating as shown in FIG. 6 until it completes a full circle. The sensor unit 16 does not rotate with the slit unit 26, but rather remains in place so that illumination that passes through the slit 28 is received by the sensor unit 16.

As shown in FIG. 7, the assembly 30 is then moved downward by an incremental step (of for example, 100 microns), and the rotating slit unit is then again rotated through a complete cycle. In this fashion, a complete scan of each portion of the line illumination field is recorded.

Figure 8:
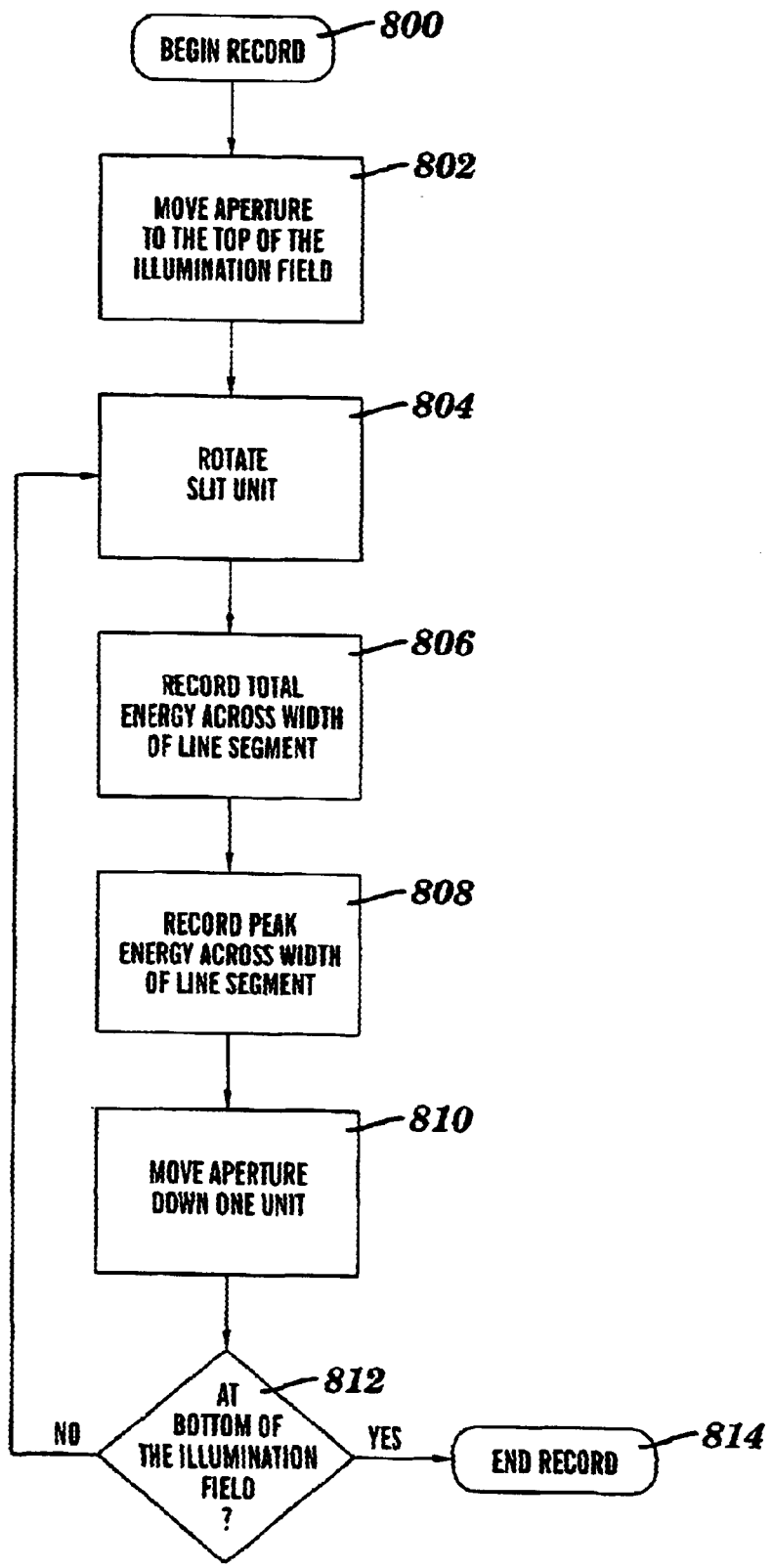
FIG. 8 shows an illustrative flowchart of a method recording data representative of the illumination field of a line of laser illumination in accordance with an embodiment of the invention.

Specifically, and with reference to FIG. 8, the process of recording illumination data (step 800) begins by moving the aperture unit to the top of the illumination field (step 802). The slit unit is then rotated through a complete revolution (step 804). The total energy across the width of the line segment is then recorded (step 806), and the peak energy across the width of the line segment is then recorded (step 808). The aperture unit is then moved down by an incremental step (step 810). If the aperture in the aperture unit is at the bottom of the line illumination field (step 812), then the process ends (step 814), otherwise the process returns to step 804 and a new set of data is recorded for the current line segment.

Figure 9:
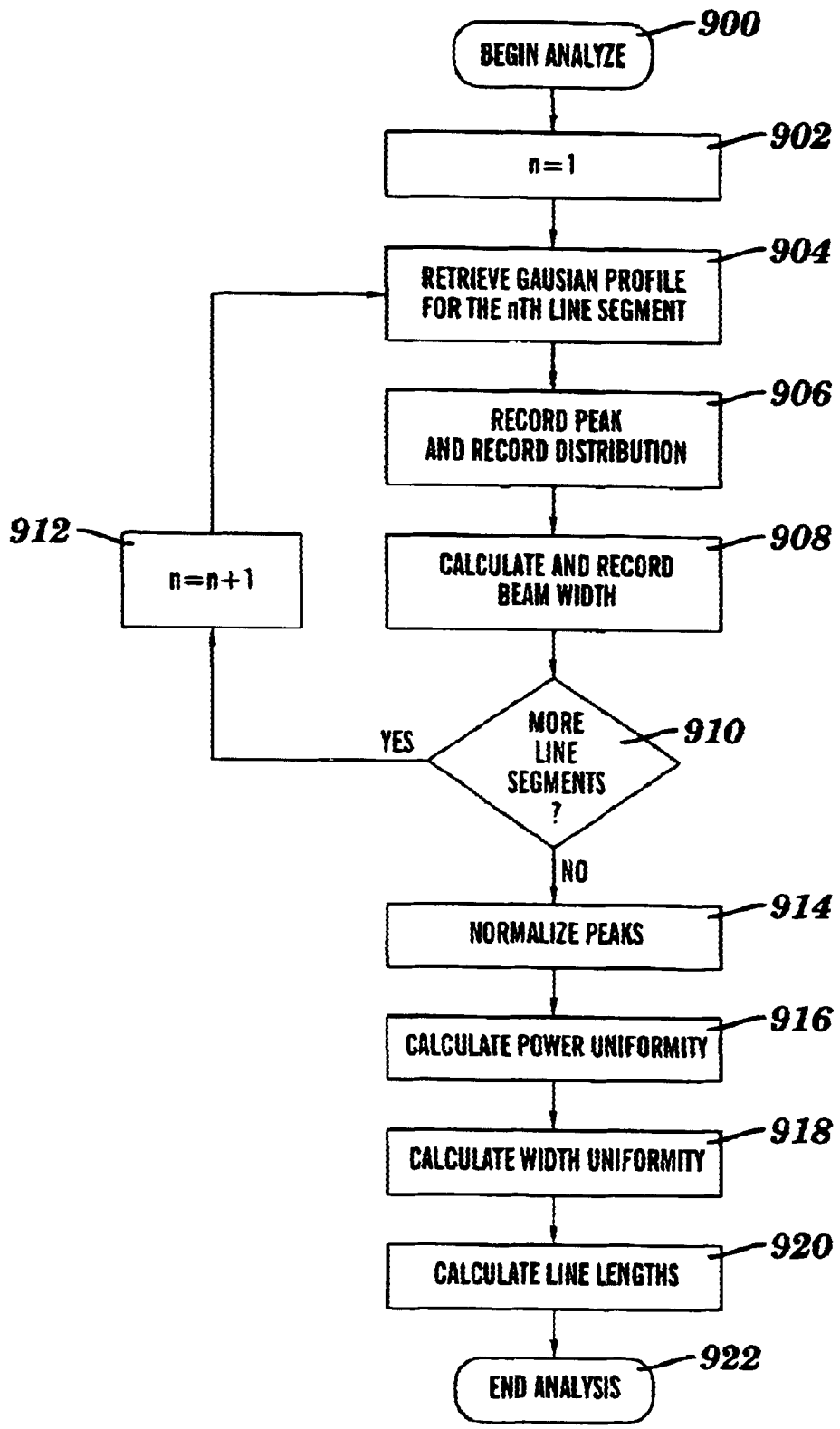
FIG. 9 shows an illustrative flowchart of a method of processing recorded data in accordance with an embodiment of the invention.

As shown in FIG. 9, once the data is recorded for the entire line illumination field, the method of analyzing the data begins (step 900) by setting the line segment variable n equal to one (step 902). The Gausian profile for the nth line segment is then retrieved (step 904), and the peak and distribution for that line segment are recorded (step 906). The beam width is also calculated and recorded (step 908). The above steps 904–908 then repeat fort each line segment until each segment of the laser line is processed. In particular, if there are more line segments to be processed (step 910), then the variable n is set to be increased by one (step 912), and the process returns to step 904.

After all n line segments have been processed, then the process continues from step 910, and the peaks are normalized (step 914). The power uniformity is then calculated (step 916), the width uniformity is then calculated (step 918), and the line length is then calculated (step 920). The process then ends (step 922). The system may then display any of a wide variety of information regarding the illumination field, such as vertical and horizontal profiles, and beam widths and uniformity.

Figure 11:
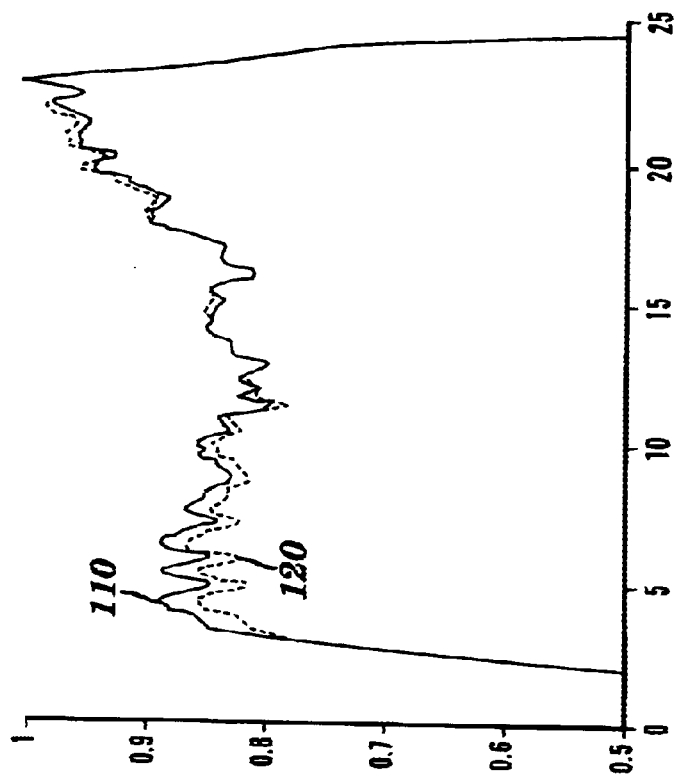
FIG. 11 shows a graphical representation of a vertical profile of the peak energy and total energy of an illumination field that was recorded in accordance with an embodiment of the invention.
Figure 10:
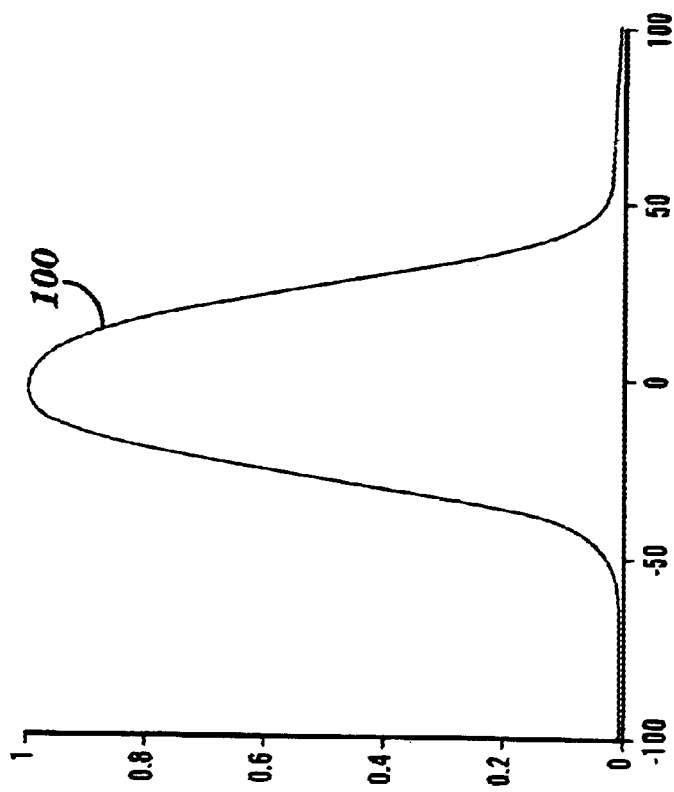
FIG. 10 shows a graphical representation of a horizontal profile of an illumination field that was recorded in accordance with an embodiment of the invention.

As shown in FIG. 10, the composite horizontal profile shows an illustrative graph 100 of the illumination field in which the x-axis is in microns and the y-axis is adjusted to apply the peak energy to a unitary value. As shown in FIG. 11, the vertical profile shows an illustrative graph 110 of the total energy along the illumination line, and shows an illustrative graph 120 of the peak energy along the illumination line. The x-axis of FIG. 11 is shown in mm, and the y-axis is unitary as shown in FIG. 10. As shown in FIG. 11, the difference between the total and peak energy is relatively small, but the uniformity of both the peak and total energies is not less than desirable. The uniformity error, in fact is 20.5% for this sample. The line length is 19.8 mm, and the power within the line is 37 Watts.

Figure 13:
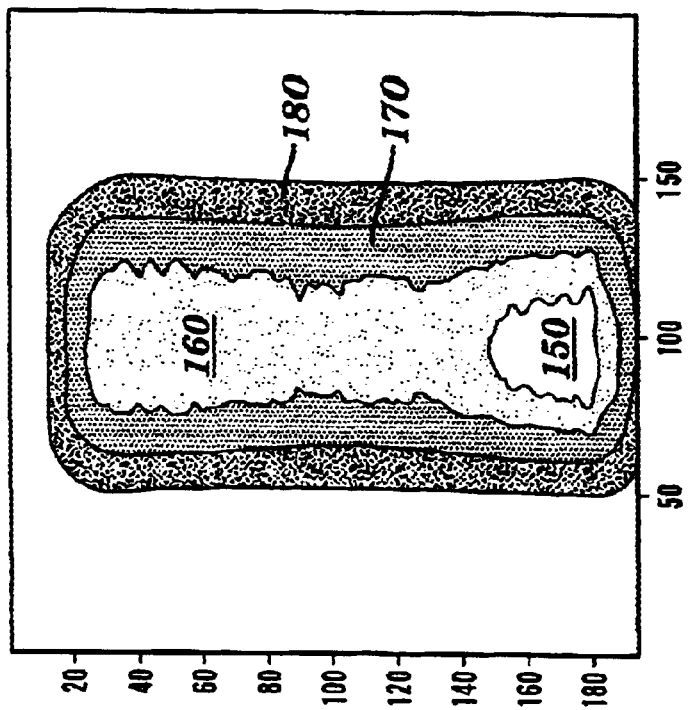
FIG. 13 shows a graphical representation of a profile with energy thresholds of an illumination field that was recorded in accordance with an embodiment of the invention.
Figure 12:
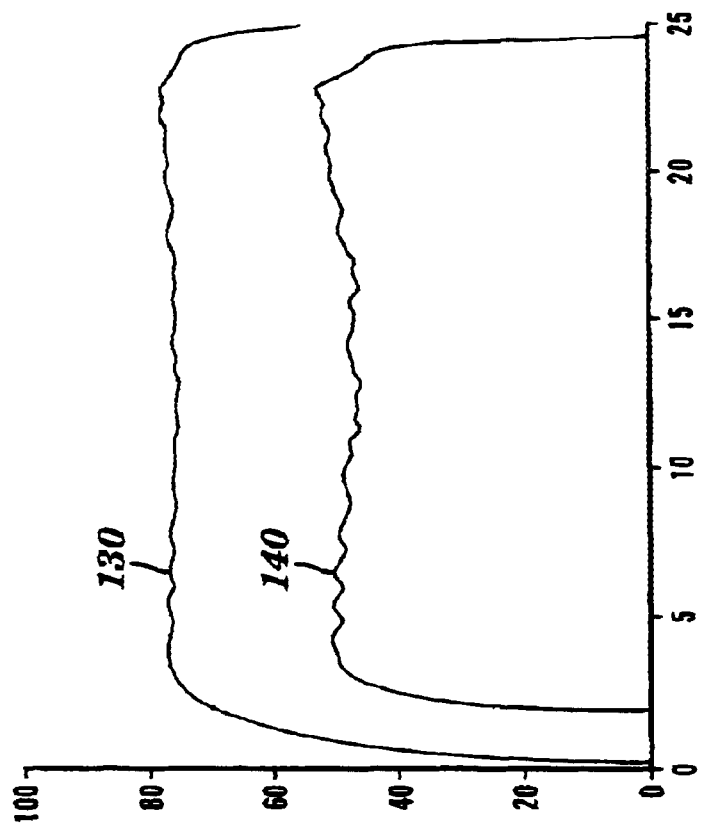
FIG. 12 shows a graphical representation of the fast axis beam width as determined based on each of $1/e^2$ and full-width-half-max for an illumination field that was recorded in accordance with an embodiment of the invention.

As shown in FIG. 12, the fast axis beam width may be determined based on a limit of $1/e^2$ (or 13.5%) as shown at 130, or maybe determined based on full-width-half-max (or FWHM) as shown at 140. The x-axis is shown in mm and the y-axis is shown in um. In the $1/e^2$ graph at 130, the beam width is 78.2 um, and the variation is 4.15%. In the graph FWHM graph 140, the beam width is 53.3 um, and the variation is 14.8%. As shown at FIG. 13, a composite illustration of the illumination line may be displayed in which the areas of highest energy are shown in area 150, areas of less energy are shown in area 160. Areas of further less energy are shown in area 170, and area 180 has the least amount of energy as determined by setting threshold values at, for example, 13.5, 25, 50, 75 and 90%.

The system, therefore, may be used to identify numerous qualities of the line of laser illumination, including uniformity of total and peak energy, uniformity in spot size, uniformity in focal points, uniformity at threshold levels, and the length and width of the illumination line.

Those skilled in the art will appreciate that numerous modifications and variations may be made to the above disclosed embodiments without departing from the spirit and scope of the present invention.

What is claimed is:

1. A method of analyzing a focused illumination field of a line of laser illumination, said method comprising the steps of:

receiving the illumination field at a first opening;

permitting a portion only of the illumination field to pass through the first opening;

receiving the portion of the illumination field from the first opening at a second opening;

permitting the portion of the illumination field to pass through the second opening and reach a sensor, said focused illumination field having a desired focal point in the area of said sensor; and moving the second opening such that no portion of the illumination field may pass through the second opening until after said first opening has been moved with respect to said illumination field, such that energy distribution data may be obtained for individual imaging spots in said imaging system.

2. A method as claimed in claim 1, wherein said method further comprises the step of moving the first opening so that a different portion of the illumination field is permitted to pass through the first opening.

3. A method as claimed in claim 1, wherein said method further comprises the step of sensing the total and peak energy of at least a portion of the illumination field.

4. A method as claimed in claim 1, wherein said method further comprises the step of rotating said second opening with respect to a sensor.

5. A method as claimed in claim 1, wherein said step of moving the second opening involves rotating an annular ring that includes said second opening with respect to said first opening.

6. A method as claimed in claim 1, wherein said method further includes the step of determining the peak and total energy of the portion of the illumination field that passes through the second opening for each position of said first opening with respect to said illumination field.

7. A method as claimed in claim 1, wherein the second opening is moved together with said first opening with respect to said illumination field.

8. A method as claimed in claim 1, wherein the second opening includes an active region through which the illumination field passes and the same active region is used for scanning each portion of the focused illumination field.

9. A method of analyzing a focused illumination field of a line of laser illumination, said method comprising the steps of:
- receiving the illumination field of the line of laser illumination at a first slit-shaped opening, said first slit-shaped opening being oriented in a direction that is generally transverse to the direction of the line of laser illumination;
- permitting a generally square shaped portion only of the illumination field to pass through the first slit-shaped opening;
- receiving the portion of the illumination field from the first opening at an outer circular wall of a rotating unit, said rotating unit including a second opening and being adapted to rotate with respect to a sensor; and
- rotating said unit such that the portion of the illumination field having a focal point within said rotating unit passes through the second opening reaching said sensor, and subsequently does not pass through the second opening as the rotating unit continues to rotate.

10. A method as claimed in claim 9, wherein said method further includes the step of determining the peak and total energy of the portion of the illumination field that passes through the second opening for each position of said first opening with respect to said illumination field.

11. A method as claimed in claim 10, wherein said step of determining the peak and total energy involves receiving a focused portion of the illumination field at a sensor.

12. A method as claimed in claim 9, wherein the second opening is moved together with said first opening with respect to said illumination field.

13. A method as claimed in claim 9, wherein the second opening includes an active region through which the focused illumination field passes and the same active region of the second opening is used for scanning each portion of the focused illumination field.

14. A method of analyzing a focused illumination field of a line of laser illumination, said method comprising the steps of:
- receiving the illumination field of the line of laser illumination at a first opening, said first opening permitting a portion only of the illumination field to pass through the first opening, said portion corresponding to a spot size in an illumination system;
- receiving the portion of the illumination field from the first opening at an outer wall of a moving unit, said moving unit including a second opening;
- moving said unit such that the portion of the illumination field passes through the second opening and is received at a sensor;
- moving said unit such that the portion of the illumination field is not passed through the second opening;
- determining the focal energy of the portion of the illumination field that is received at said sensor; and
- moving both said first opening and said second opening with respect to said illumination field such that another portion only of the illumination field to pass through the first opening.

15. A method as claimed in claim 14, wherein the moving unit comprises a rotating unit and the portion of the illumination field that passes through said second opening has a focal point within said rotating unit.

16. A method of analyzing a focused illumination field of a line of laser illumination, said method comprising the steps of:
- receiving the illumination field of the line of laser illumination at an active region of a first opening, said first opening permitting a first portion only of the illumination field to pass through the first opening and said first portion passing through said first opening at said active region thereof;
- receiving the first portion of the illumination field from the active region of said first opening at an outer wall of a moving unit, said moving unit including a second opening;
- moving said unit such that the first portion of the illumination field passes through an active region of the second opening and is received at a sensor;
- moving said unit such that the first portion of the illumination field is not passed through the second opening;
- determining the focal energy of the portion of the illumination field that is received at said sensor;
- moving said first opening with respect to said illumination field such that a second portion of said illumination field is permitted to pass through the active region of the first opening; and
- moving said second opening with respect to said illumination field such that the second portion of the illumination field is permitted to pass through the active region of the second opening.

* * * * *